US008564593B2

(12) United States Patent  (10) Patent No.: US 8,564,593 B2
Johnson et al.  (45) Date of Patent: Oct. 22, 2013

(54) ELECTRONIC STOOL SUBTRACTION USING QUADRATIC REGRESSION AND INTELLIGENT MORPHOLOGY

(75) Inventors: C. Daniel Johnson, Scottsdale, AZ (US); Michael J. Carston, Rochester, MN (US); Armando Manduca, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 863 days.

(21) Appl. No.: 12/523,484

(22) PCT Filed: Jan. 22, 2008

(86) PCT No.: PCT/US2008/051710
§ 371 (c)(1),
(2), (4) Date: Jan. 27, 2010

(87) PCT Pub. No.: WO2008/089492
PCT Pub. Date: Jul. 24, 2008

(65) Prior Publication Data
US 2010/0128036 A1    May 27, 2010

Related U.S. Application Data

(60) Provisional application No. 60/881,232, filed on Jan. 19, 2007.

(51) Int. Cl.
*G06T 17/00* (2006.01)
*G06T 15/00* (2011.01)

(52) U.S. Cl.
USPC ............................. 345/424; 345/419; 345/420

(58) Field of Classification Search
None
See application file for complete search history.

(56) References Cited

U.S. PATENT DOCUMENTS 5,891,030 A   4/1999  Johnson et al.
5,913,820 A   6/1999  Bladen et al.
(Continued)

FOREIGN PATENT DOCUMENTS

WO   WO 2007/030132      3/2007
WO   WO 2008/089483 A3   7/2008
(Continued)

OTHER PUBLICATIONS

Carston, Michael J. et al., "CT Colonography of the Unprepared Colon: An Evaluation of Electronic Stool Subtraction", SPIE Medical Imaging, vol. 5746, pp. 424-431, 2005.

(Continued)

*Primary Examiner* — Kee M Tung
*Assistant Examiner* — Leon T Cain, II
(74) *Attorney, Agent, or Firm* — Faegre Baker Daniels LLP

(57) ABSTRACT

An improved method for processing image voxel data representative of 3-dimensional images of a colon to remove the effects of tagged stool. The method uses parabolic curve intensity-gradient models at a transition between two material types as a function of the fraction of the two materials for each of a plurality of two-material type classes, including a gas-tissue transition model, a gas-stool transition model and a stool-tissue transition model. The voxels are classified into one of a plurality of substance classes including tagged stool, gas, tissue and unknown classes. The unknown class voxels are processed to classify the unknown class voxels into one of the two-material type classes. The two-material type class voxels are processed to determine the fractions of materials in each voxel. The intensity of the two-material type class voxels is then adjusted as a function of the fraction of the materials in the voxels.

15 Claims, 2 Drawing Sheets

(56) References Cited

U.S. PATENT DOCUMENTS

| | | | |
|---|---|---|---|
| 6,374,134 | B1 | 4/2002 | Bladen et al. |
| 6,516,212 | B1 | 2/2003 | Bladen et al. |
| 6,522,907 | B1 | 2/2003 | Bladen et al. |
| 6,757,557 | B1 | 6/2004 | Bladen et al. |
| 6,785,410 | B2 | 8/2004 | Vining et al. |
| 6,909,913 | B2 | 6/2005 | Vining |
| 6,928,314 | B1 | 8/2005 | Johnson et al. |
| 6,947,784 | B2 | 9/2005 | Zalis |
| 7,035,681 | B2 | 4/2006 | Johnson et al. |
| 7,149,564 | B2 | 12/2006 | Vining et al. |
| 7,174,202 | B2 | 2/2007 | Bladen et al. |
| 2002/0097320 | A1* | 7/2002 | Zalis ............................. 348/65 |
| 2006/0018549 | A1 | 1/2006 | Liang et al. |
| 2006/0047227 | A1 | 3/2006 | Jerebko |
| 2006/0270928 | A1 | 11/2006 | Geiger et al. |
| 2007/0003131 | A1 | 1/2007 | Kaufman |
| 2007/0071298 | A1* | 3/2007 | Kiraly et al. .................. 382/128 |
| 2007/0167722 | A1 | 7/2007 | Bladen et al. |
| 2009/0304248 | A1* | 12/2009 | Zalis et al. .................... 382/131 |

FOREIGN PATENT DOCUMENTS

| | | | |
|---|---|---|---|
| WO | WO 2008/089489 | A2 | 7/2008 |
| WO | WO 2008/089490 | A2 | 7/2008 |
| WO | WO 2008/089492 | A2 | 7/2008 |

OTHER PUBLICATIONS

Cotton, Peter B. et al., "Computed Tomographic Colonography (Virtual Colonoscopy): A Multicenter Comparison With Standard Colonoscopy for Detection of Colorectal Neoplasia", JAMA, Apr. 14, 2004, vol. 291, No. 14, pp. 1713-1719.

Gatto, Nicolle M. et al., "Risk of Perforation After Colonoscopy and Sigmoidoscopy: A Population-Based Study", Journal of the national Cancer institute, vol. 95, No. 3, Feb. 5, 2003, pp. 230-236.

Iannaccone, Riccardo et al., "Computed Tomographic Colonography Without Cathartic Preparation for the Detection of Colorectal Polyps", Gastroenterology, vol. 127, pp. 1300-1311, 2004.

International Search Report and Written Opinion for PCT/US2008/051676, mailed Aug. 1, 2008, 10 pages.

International Search Report and Written Opinion for PCT/US2008/051699, mailed Jul. 11, 2008, 10 pages.

International Search Report and Written Opinion for PCT/US2008/051703, mailed Jul. 14, 2008, 9 pages.

International Search Report and Written Opinion for PCT/US2008/051710, mailed Jul. 30, 2008, 12 pages.

Jemal, Ahmedin et al., "Cancer Statistics 2003", CA Cancer J Clin 2003; 53:5-26.

Johnson, C. Daniel et al., "prospective Blinded Evaluation of Computed Tomographic Colonography for Screen Detection of Colorectal Polyps", Gastroenterology 2003; 125:311-319.

Lakare, Sarang et al., "Electronic Colon Cleansing Using Segmentation Rays for Virtual Colonoscopy", SPIE Medical Imaging, vol. 4683 pp. 412-418, 2002.

Lakare, Sarang et al., "Robust Colon Residue Detection Using Vector Quantization Based Classification for Virtual Colonoscopy", SPIE Medical Imaging, vol. 5031, pp. 515-520, 2003.

Lieberman, David A. et al., "Use of Colonoscopy to Screen Asymptomatic Adults for Colorectal Cancer", The New England Journal of Medicine, vol. 343, Jul. 20, 2000, No. 3, pp. 162-169.

Pickhardt, Perry J. et al., "Computed Tomographic Virtual Colonoscopy to Screen for Colorectal Neoplasia in Asymptomatic Adults", The New England Journal of medicine, Dec. 4, 2003, vol. 349, No. 23, pp. 2191-2200.

Ristvedt, Stephen L. et al., "Patient Preferences for CT Colonography, Conventional Colonoscopy, and Bowel Preparation", The American Journal of Gastroenterology, vol. 98, No. 3, 2003, pp. 579-585.

Seeff, Laura C. et al., "Are We Doing Enough to Screen for Colorectal Cancer? Findings From the 1999 Behavioral Risk Factor Surveillance System", The Journal of Family Practice, vol. 51, No. 9, Sep. 2002, pp. 761-766.

Serlie, Iwo et al., "A Probabilistic Method for Virtual Colonoscopy Cleansing", SPIE Medical Imaging, vol. 5031, pp. 405-412, 2003.

Serlie, Iwo et al., "Computed Cleansing for Virtual Colonoscopy Using a Three-Material Transition Model", R.E. Ellis and T.M. Peters (Eds.): MICCAI 2003, LNCS 8979, pp. 175-183, 2003, © Springer-Verlag Berlin Heidelberg 2003.

Weitzman, Elissa R. et al., "Risk and Reluctance: Understanding Impediments to Colorectal Cancer Screening", Preventive Medicine 32, 502-513 (2001.

Winawer, Sidney J. et al., "Prevention of Colorectal Cancer by Colonoscopic Polypectomy", The New England Journal of Medicine, vol. 329, No. 27, Dec. 30, 1993, pp. 1978-1981.

Zalis, Michael E. et al., "Digital Subtraction Bowel Cleansing for CT Colonography using Morphological and Linear Filtration Methods", IEEE Transactions on Medical Imaging. vol. 23, pp. 1335-1343, 2004.

* cited by examiner

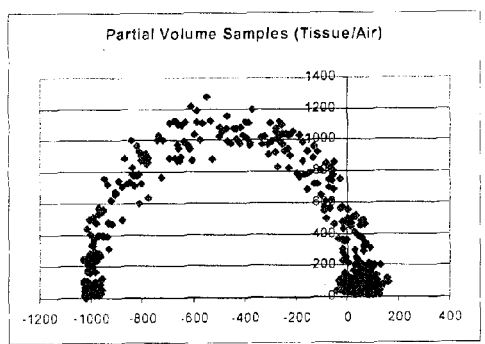 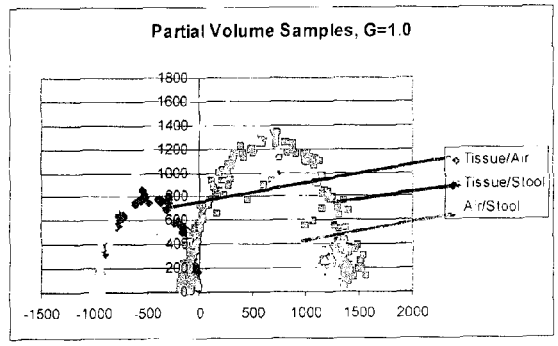
Fig. 1A　　　Fig. 1B
 
Fig. 2A　　　Fig. 2B
 
Fig. 3A　　　Fig. 3B

ELECTRONIC STOOL SUBTRACTION USING QUADRATIC REGRESSION AND INTELLIGENT MORPHOLOGY

REFERENCE TO RELATED APPLICATION

This application claims the benefit of U.S. provisional application Ser. No. 60/881,232, filed Jan. 19, 2007 and entitled Electronic Stool Subtraction Using Quadratic Regression and Intelligent Morphology, which is incorporated herein in its entirety by reference.

GOVERNMENT LICENSE RIGHTS

This invention was made with government support under Government Contract No. CA075333 awarded by the National Cancer Institute. The government has certain rights in the invention.

FIELD OF THE INVENTION

The invention relates generally to CT colonography. In particular, the invention is a method for electronically identifying and removing stool from colonography images.

BACKGROUND

Colon cancer is the third most common and second deadliest cancer in the US, with 135,000 new cases diagnosed and 56,000 deaths each year. Most colorectal cancers begin as benign polyps that produce few symptoms but can be found in screening examinations. Since most polyps grow very slowly, deaths from colon cancer could be markedly reduced with effective screening of the population over 50 years old. Common screening options include barium enema, colonoscopy, and, increasingly, CT colonography. Colonoscopy is considered the gold standard, and involves passing an endoscope through the entire colon. It has high sensitivity (~95%), and has the advantage that polyps, if found, can be removed during the examination. However, it requires sedation, and there is a finite chance of bowel perforation (2 in 1000) or even death (1 in 19000). It also requires complete bowel preparation. Typically, this involves up to two days of fasting drinking only clear liquids, and ingestion of large amounts of laxative in the 24 hours prior to the exam to cleanse the colon as completely as possible. The inconvenience and discomfort associated with this preparation is an important obstacle to compliance with currently recommended colorectal screening guidelines. It is estimated that only 40% of the population above 50 years old undergo any kind of colon screening, and only 25% undergo a full colorectal structural exam. By contrast, 85% of women in the appropriate age group undergo mammography. Patient surveys show that the necessity for bowel preparation is cited as the main reason for avoiding colon examination.

CT colonography (CTC) is being extensively studied as an alternative for colon examinations, since it offers many advantages such as lower risk and less patient discomfort. By way of example, these technologies are disclosed in the Johnson et al. U.S. Pat. Nos. 6,928,314 and 7,035,681, the Zalis U.S. Pat. No. 6,947,784, the Vining U.S. Pat. Nos. 6,909,913 and 7,149,564 and PCT publication no. WO 2007/030132, all of which are incorporated herein by reference. Briefly, CT data covering the entire colon is acquired and examined on a computer workstation, either paging through 2D slices with orthogonal views and 3D rendering available, or using a full 3D endoscopic fly-through of the colon.

CTC as typically performed often requires complete bowel preparation. If the onerous bowel preparation could be eliminated, it can be expected that patient compliance would dramatically improve. However, in an unprepared colon residual stool and fluid can mimic soft tissue density and thus confound the identification of polyps. Various groups have proposed tagging the stool with an opacifying agent so that it is brighter than soft tissue and thus easily recognized automatically. Pixels identified as stool can then be electronically subtracted away by being reset to air values. Most commonly, this is done in conjunction with partial bowel preparation, such as a low-fiber or liquid diet for 24-48 hours before the exam.

Enhanced patient compliance may be achieved when the inconvenience and discomfort to the patient is as small as possible. Accordingly, there is ongoing research involving unprepared CT colonography, with no dietary restrictions, no laxatives, and simple ingestion of oral barium and iodine beginning 48 hours before the exam. This approach leads to colonic content that can be solid, liquid, or semi-liquid. Stool tagging is usually homogenous, especially past the ascending colon.

SUMMARY

The invention is an improved method for processing image voxel data representative of 3-dimensional images of a colon to remove the effects of tagged stool. One embodiment of the method includes providing an intensity-gradient model representative of the intensity and gradient relationship at a transition between two material types as a function of the fraction of the two materials for each of a plurality of two-material type classes, including a gas-tissue transition model, a gas-stool transition model and a stool-tissue transition model. The voxels are classified into one of a plurality of substance classes including tagged stool, gas, tissue and unknown classes. The unknown class voxels are processed as a function of the intensity-gradient models to classify the unknown class voxels into one of the two-material type classes. The two-material type class voxels are processed as a function of the associated intensity-gradient model to determine the fractions of materials in each voxel. The intensity of the two-material type class voxels is adjusted as a function of the fraction of the materials in the voxels.

BRIEF DESCRIPTION OF THE DRAWINGS

FIGS. 1A and 1B are plots of observed combinations of intensity and gradient values for areas surrounding the colon from sample image data with no stool, including tissue-air, tissue-stool and air-stool transition areas.

FIGS. 2A and 2B are images of a portion of a colon. Marked stool is shown in FIG. 2A. The stool is electronically removed from the image in FIG. 2B by a method in accordance with one embodiment of the invention.

FIGS. 3A and 3B are images of a portion of a colon with folds. Thin coats of stool is attached to the folds in FIG. 3A. The thin coats of stool are electronically removed from the image in FIG. 3B by a method in accordance with another embodiment of the invention.

DETAILED DESCRIPTION OF THE INVENTION

Figure 4A:
FIGS. 4A and 4B are images of a portion of a colon including a polyp surrounded by stool. Marked stool is shown in FIG. 4A. The stool is electronically removed from the image in FIG. 4B by a method in accordance with an embodiment of the invention.
Figure 4B:
Figure 5A:
FIGS. 5A and 5B are images of a portion of a colon including a polyp surrounded by stool. Marked stool is shown in FIG. 5A. The stool is electronically removed from the image in FIG. 5B by a method in accordance with an embodiment of the invention.
Figure 5B:
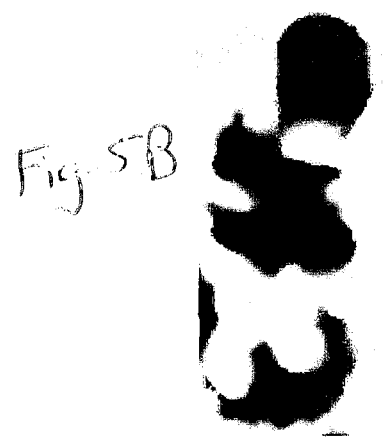
Figure 6:
FIG. 6 is a three dimensional rendering of a portion of a colon following stool subtraction in accordance with an embodiment of the invention.

The invention is an algorithm for electronic stool subtraction under conditions of the type described above. CT colonography on the unprepared colon was performed on 26 patients who were prescheduled for traditional colonoscopy. Patients received 21 grams of oral barium over a 48 hour period prior to the CT exam and 30 ml of iodine contrast agents over a 24 hour period prior to the exam. No dietary restriction was required. Conventional low dose (50 mAs) CT colonography was performed with 1.25 mm collimation and 1.25 mm reconstruction intervals. The in-plane resolution ranged from 0.72 mm to 0.86 mm, with the majority of the images having a resolution of 0.78 mm. An algorithm based on modeling the relationship between intensity and gradient values between material types was used to electronically subtract the stool from the CT image.

CTC scans contain three materials of interest, namely tagged stool, tissue, and air. Other materials, such as bone, are present in the scan. However, they are located away from the colon and hence are not of interest. Due to partial volume and system blur effects, voxels frequently do not represent a single material type, but rather a mixture of two or three materials. Thus, naïve algorithms such as intensity thresholding may lead to unacceptable results, including halo artifacts and abrupt transitions between tissue and subtracted stool.

In order to successfully remove tagged stool from a CT image, it is advantageous to accurately estimate the fraction of stool and tissue present at each voxel. The stool removal process described in this document estimates the material percentages at each voxel by modeling the image intensities and gradients between material types.

The stool subtraction algorithm uses an accurate assessment of the relationship between intensity and gradient at the transitions between two-material types. Scatter plots were generated at the transition regions between tissue-air, stool-tissue, and stool-air. These scatter plots revealed an approximately parabolic relationship between intensity and gradient at any particular two-material transition (FIG. 1). For any given parabola type, the gradient achieves its maximum value midway between the two material types, and corresponds to the vertex of the parabola. The gradient gradually approaches zero as the mixtures becomes entirely one material type.

The parabolas for the stool-air and stool-tissue transitions are assumed to be functions of the local maximum stool value $S_{max}$. The value $S_{max}$ represents the local intensity value for voxels that consist entirely of tagged stool. This local maximum stool value varies from region to region within the image. Furthermore, $S_{max}$ is not necessarily observed, i.e., voxels in these material transitions do not necessarily achieve the local stool maximum. In order to simplify the algebraic formulae of the tissue-air and stool-tissue parabolas, the intensity value of tissue is assumed to be zero.

Under these assumptions, the formulae for the three parabolas are as follows:

1. Tissue-air: This parabola is fixed and passes through the points (−1000,0), (−500, 1000), and (0,0). The resulting equation is $$\nabla I = \frac{-4}{1000} * I^2 - 4 * I \quad (1)$$

2. Stool-tissue: This parabola is a function of $S_{max}$ and passes through the points $$(0, 0), \left(\frac{S_{max}}{2}, S_{max}\right), \text{ and } (S_{max}, 0).$$

The resulting equation is $$\nabla I = \frac{-4}{S_{max}} * I^2 + 4 * I \quad (2)$$

3. Stool-air: This parabola is a function of $S_{max}$ and passes through the points (−1000,0), $$\left(\frac{S_{max} - 1000}{2}, S_{max} - 1000\right), \text{ and } (S_{max}, 0).$$

The resulting equation is $$\nabla I = \frac{-4}{S_{max} + 1000} * (I + 1000) * (I - S_{max}) \quad (3)$$

The subtraction algorithm operates entirely in three dimensions. The algorithm first identifies voxels that belong to a single material type, i.e., stool, air, or tissue. The algorithm then uses least-squares quadratic regression to identify voxels that belong to two-material transition types, and estimates the value of $S_{max}$ for each voxel. Partial volume estimates for each voxel are computed based on the transition type and estimated value of $S_{max}$.

The algorithm assumes that the stool is well tagged and somewhat homogeneous. Liquid stool is neither assumed nor required. In one embodiment, the algorithm can handle stool with intensity of 180 HU or greater.

The processing begins by first identifying those voxels that are deemed to belong entirely to one material type. Example decision rules are as follows:
1. Stool: $I \geq 180$ and $\nabla I \leq 0.8 * I$
2. Air: $I \leq -800$ and $\nabla I \leq 250$
3. Tissue: $-250 \leq I \leq 150$ and $\nabla I \leq 300$
4. Otherwise unclassified The single material type classification is further refined using a series of heuristic and intelligent morphological operations. The first operation begins by making a mask of the voxels deemed to be entirely stool. Based on the assumption that it is impossible for tissue to be entirely surrounded by stool, any holes within this mask are filled. These holes are then reclassified as full stool.

The next morphological operation identifies unclassified voxels that are surrounded entirely and only by tissue voxels.

These are assumed to be tissue voxels that are unclassified due to unusually high or low intensities or large gradients caused by image noise. These voxels are reclassified as full tissue.

The algorithm then attempts to classify the unknown voxels as belonging to one of the three two-material transition types. The transition type identification is accomplished by fitting a least-squares regression to each of the three parabolas listed above. Each regression is computed using the intensity and gradient values at five points: the target voxel, the voxels at $\pm d_1$ units away in the direction of the gradient, and the voxels at $\pm d_2$ units away in the direction of the gradient ($0 \leq d_1 \leq d_2$). Intensity and gradient values in the direction of the gradient are used since in theory they should follow the parabola of a given transition type as they move from one material to the other. With the exception of the target voxel, cubic spline interpolation was used to compute the intensity and gradient values.

The regression subroutine begins with the tissue-air parabola. Since this parabola is fixed, the regression simply assesses the quality of fit by computing the average orthogonal distance from the points to the parabola given in (1).

The subroutine proceeds by computing the regression to the stool-tissue parabola, which is a function only of $S_{max}$. The value of $S_{max}$ is estimated and the quality of fit is assessed, again using orthogonal residuals. The stool-air parabola is also only a function of $S_{max}$, and the regression to the stool-air parabola is computed similarly.

The regression subroutine then compares the orthogonal residuals of the three regressions. The parabola with smallest average residual is selected. If the parabola represents either the stool-tissue or stool-air material type, both the transition type and value of $S_{max}$ are recorded for that voxel. Otherwise, for the tissue-air parabola, only the transition type for the voxel is recorded.

The regression routine is iterated over several values of $d_1$ and $d_2$. The routine begins by computing the regression for $d_1 = \pm 1.5$ and $d_2 = \pm 1.0$. The regression is repeated for $d_1 = \pm 1.0$ and $d_2 = \pm 0.5$, and then again for $d_1 = \pm 0.6$ and $d_2 = \pm 0.3$. The qualities of fit for the three iterations are compared. The best result is selected, and the corresponding parabola type and estimate for $S_{max}$ are retained.

Iterating over smaller distances is useful in situations where the target voxel resides on a thin piece of material. In these cases, larger distances may result in mistaken classifications since the interpolated pixels could reside with material types not related to the transition region. The iterative framework has shown especially good results in cases where a thin fold is surrounded by homogeneous tagged stool.

Because of their large gradients, regions of heterogeneous stool may be misclassified as stool-tissue transitions. This may lead to incomplete subtraction that is not only visually distracting, but may also mimic polyps in the final image. To correct these misclassifications, the algorithm re-examines each stool-tissue voxel to attempt to determine if it is actually full stool. At each stool-tissue voxel, the algorithm examines the classification and intensity of its neighbor one voxel away in the direction of the gradient. Nearest neighbor interpolation and cubic spline interpolation are used to compute the classification and intensity, respectively, of the neighboring voxel. If the neighboring voxel has an intensity less than the target voxel and is classified as full stool, then the target voxel is reclassified as full stool. This process is iterated three times. This reclassification is successful at capturing moderately heterogeneous stool.

Once the material type has been identified and the value $S_{max}$ computed, the partial volume estimates for stool and tissue can be computed. The formulas for computing the partial volume fractions assume that the average intensity of tissue is 0 HU.

The formulae for the percentage of stool, ps, and percentage of tissue, pt, are as follows:

1. Tissue-air transition type:

$$ps = 0$$

$$pt = 1 - \left(\frac{I}{-1000}\right)$$

2. Stool-tissue mixture type:

$$ps = I/S_{max}$$

$$pt = 1 - ps$$

3. Stool-air mixture type:

$$ps = \left(\frac{I + 1000}{S_{max} + 1000}\right)$$

$$pt = 0$$

In regions where thin coats of stool have adhered to tissue, the intensity-gradient relationship differs from the two-material transitions described above. These thin-stool regions typically consist of three-material transitions between tissue, stool, and air. Due to partial volume effects, the intensity-gradient relationship in these regions usually look like stool-air transitions, but with an $S_{max}$ value that is significantly smaller than the true stool maximum. Thus the quadratic regression may incorrectly label the thin stool areas as stool-air transitions, which if uncorrected could lead to fold and tissue erosion.

The thin-stool regions are identified by first creating a mask of all voxels with any sort of stool involvement, that is any voxels labeled as full stool, stool-air, or stool-tissue. For each voxel in the stool involvement mask, the distance to the nearest region with no stool involvement is computed using a rapid chamfer distance transform. The chamfer distance transform assigns distance values of 3 for first-order neighbors, 4 for second-order neighbors, and 5 for third-order neighbors. This distance transform provides a local estimate of the thickness of the stool. Any voxel that has a thickness of less than 8 chamfer units (and not attached to stool thicker than 8 chamfer units) is deemed to be thin stool.

The partial volume estimates for each thin stool voxel are computed using its estimated thickness and its distance to known air. The computations are based on the assumption that perfect step-edges between material types are convolved by an approximately Gaussian point spread function during the imaging process. This results in edges whose profiles are Gaussian cumulative distribution functions (CDFs).

Let s be the estimated local thickness of a thin stool voxel (in chamfer distance units), and let a be its chamfer distance to known air. Also assume that a voxel with a thickness of 8 chamfer units represents full stool, and that a voxel 8 chamfer units from air has no air involvement. Thus, normalized thickness and distance measures can be defined as:

$$ds = s/8$$

$$da = \begin{cases} a/8 & a \leq 8 \\ 1 & a > 8 \end{cases}$$

So that both ds and da are between 0 and 1. The partial volume estimates are then computed using a Gaussian CDF:

$$ps = \frac{1}{2}\left(1 + \text{Erf}\left(\frac{ds - 0.5}{\sigma}\right)\right)$$

$$pa = \frac{1}{2}\left(1 + \text{Erf}\left(\frac{da - 0.5}{\sigma}\right)\right)$$

$$pt = 1 - (pa - ps)$$

An appropriate value for sigma was found empirically (e.g., $\sigma=0.27$.).

A light Gaussian filter (currently $\sigma=0.7$ mm) is applied to the partial volume vectors in order to smooth the transitions from stool to tissue, and also to reduce artifacts caused by isolated misclassifications of voxels.

At voxels with tagged stool preset, the stool is removed by reducing the intensity in inverse proportion to the amount of tissue remaining. Voxels that have no tissue are set to $-1000$ HU, while voxels that are entirely tissue are unchanged. Thus, the interval $[0,1]$ is linearly mapped onto the interval $[-1000, I_{orig}]$, where $I_{orig}$ is the intensity in the median filtered data. The new voxel intensity thus is given by $$I_{new} = pt*(I_{orig}+1000)-1000$$

It should be noted that this intensity remapping function is an estimate. As an example, consider a stool-tissue voxel with intensity of 1000 and an estimated $S_{max}$ of 2000. Then pt=0.5, and the voxel should be remapped to approximately $-0.500$ HU. However, with the remapping function given above, the new intensity is $$I_{new}=0.5*(1000+1000)-1000=0$$

Alternative remapping functions can be used. Any such remapping function will preferably consider not only the percentage of stool present, but also a local tissue value (analogous to $S_{max}$).

Morphological processing is performed to remove any areas that are entirely surrounded by air. Such areas can arise in regions of poorly tagged or heterogeneous stool.

Examples of some data processing algorithms that can be used in connection with the invention follow. Consider the least squares estimate of the stool-tissue parabola. The equation of this parabola is given in the methods section. For simplicity, let x=I, y=∇I, S=$S_{max}$, and $\alpha=-4/S_{max}$. Then $$y=\alpha x^2+4x$$

Minimize the sum of the squared residuals given as $$R=\Sigma(y_i-(\alpha x_i^2+4x_i))^2$$

Taking the derivative with respect to $\alpha$, results in $$\frac{dR}{d\alpha} = 2\sum (y_i - (\alpha x_i^2 + 4x))(-x_i^2)$$

Setting the derivative to zero and rearranging terms, provides $$\alpha\Sigma x_i^4 + 4\Sigma x_i^3 - \Sigma x_i^2 y_i = 0$$

Solving for $\alpha$ and using the variable substitution given above, our estimate for $S_{max}$ is $$S_{max} = \frac{-4\sum x_i^4}{\sum x_i^2 y_i - 4\sum x_i^3}$$

Instead of computing the least squares estimate for the stool-air parabola directly, the regression routine first translates the intensity data points to the right 1000 units. The value of $S_{max}$ is then computed using the least squares estimator for the stool-tissue parabola, and then subtracting 1000 from the estimate.

In the Cartesian plane the distance from a point $(x_0, y_0)$ to the parabola can be given by $$y=\alpha x^2+\beta x+\gamma, \alpha,\beta,\gamma \in \mathfrak{R}$$

Thus, the point $(X, \alpha X^2+\beta X+\gamma)$ such that the distance $$d(X)=\sqrt{(X-x_0)^2+(\alpha X^2+\beta X+\gamma-y_0)^2} \quad (1)$$

is minimized. It is sufficient to minimize the argument inside the square root operator.

Let $$D=(X-x_0)^2+(\alpha X^2+\beta X+\gamma-y_0)^2$$

Then $$\frac{dD}{dX} = 2(X - x_0) + 2(\alpha X^2 + \beta X + \gamma - y_0)(2\alpha X + \beta)$$

Setting the derivative equal to zero and rearranging terms, provides $$\frac{dD}{dX} = 2\alpha^2 X^3 + 3\alpha\beta X^2 + (2\alpha\gamma - 2\alpha y_0 + \beta^2 + 1) \quad (2)$$

$$X + \beta\gamma - \beta y_0 - x_0$$

$$= 0$$

The solutions to this cubic equation are solved using Cardano's formula. Either one or three real roots are returned. In the case where a single real root is found, simply compute the distance using (1). In the case where three real roots are found, compute the distance for all three candidate points, and the smallest result is selected.

Although the present invention has been described with reference to preferred embodiments, those skilled in the art will recognized that changes can be made in form and detail without departing from the spirit and scope of the invention.

What is claimed is:

1. A method for processing image voxel data representative of 3-dimensional images of a colon having gas and stool tagged with stool tagging agent, to remove the effects of the tagged stool, including:

providing a plurality of intensity-gradient models, each intensity-gradient model representative of the intensity and gradient relationship at a transition between two material types as a function of the amounts of the two material types, the models including at least a gas-tissue transition model representative of a transition between gas and tissue material types, a gas-stool transition model representative of a transition between gas and stool material types, and a stool-tissue transition model representative of a transition between stool and tissue material types;

classifying the voxels into one of a plurality of material type classes including tagged stool, gas, tissue and unknown classes;

processing the voxels classified into the unknown material type class as a function of the intensity-gradient models including at least the gas-tissue model, the gas-stool model and the stool-tissue model to classify the unknown material type class voxels into one of the two-material type classes including the gas and tissue material type class, the gas and stool material type class and the stool and tissue material type class;

processing the voxels classified into the two-material type classes as a function of the associated intensity-gradient model to determine the amounts of the two material types in each voxel; and remapping intensities of the voxels classified into the two-material type classes as a function of the amounts of the two material types in the voxels.

2. The method of claim 1 wherein the intensity gradient models are parabolic curve models.

3. The method of claim 2 wherein:
the intensity gradient models are functions of local maximum stool intensities; and
processing the unknown class voxels includes estimating the maximum stool intensity of the voxels.

4. The method of claim 3 wherein processing the unknown class voxels includes performing a regression.

5. The method of claim 4 wherein processing the unknown class voxels includes processing the voxels as a function of the intensity-gradient models, the intensity and gradient of the unknown class voxels and the intensity and gradient of spatial neighbor voxels of the unknown class voxels.

6. The method of claim 5 wherein:
processing the two-material type class voxels includes processing the voxels to determine the amounts of stool and/or tissue in each voxel; and
remapping the intensities of the two-material type class voxels includes remapping the intensities as a function of the determined amounts of stool and/or tissue in each voxel.

7. The method of claim 1 wherein processing the unknown class voxels includes processing the voxels as a function of the intensity-gradient models, the intensity and gradient of the unknown class voxels and the intensity and gradient of spatial neighbor voxels of the unknown class voxels.

8. The method of claim 1 wherein:
processing the two-material type class voxels includes processing the voxels to determine the amounts of stool and/or tissue in each voxel; and
remapping the intensities of the two-material type class voxels includes remapping the intensities as a function of the determined amounts of stool and/or tissue in each voxel.

9. The method of claim 1 and further including reclassifying voxels as a function of morphological operations.

10. The method of claim 9 and further including remapping the intensities of voxels as a function of morphological operations.

11. The method of claim 1 and further including remapping the intensities of voxels as a function of morphological operations.

12. The method of claim 1 and further including:
providing a three material transition model;
identifying three-material type class voxels representing a thin coating of stool adhering to tissue;
processing the three-material type class voxels as a function of the three material transition model to determine the amounts of the materials in each voxel; and
remapping intensities of the three-material type class voxels as a function of the amounts of the materials in the voxels.

13. The method of claim 12 wherein identifying the three-material type class voxels includes identifying the voxels as a function thicknesses of regions classified as including tagged stool and distances to regions classified as containing no tagged stool.

14. The method of claim 13 wherein processing the three-material type class voxels includes determining the amounts of the materials in each voxel as a function of thicknesses of regions classified as containing tagged stool and distances to regions classified as all gas.

15. The method of claim 14 wherein processing the three-material type class voxels includes determining the amounts of the materials in each voxel as a function of thicknesses of regions classified as containing tagged stool and distances to regions classified as all gas.

* * * * *